Aug. 26, 1930.  B. J. COOMES  1,774,318
APPARATUS FOR REDUCING GRAVEL TO SAND
Filed Feb. 20, 1928
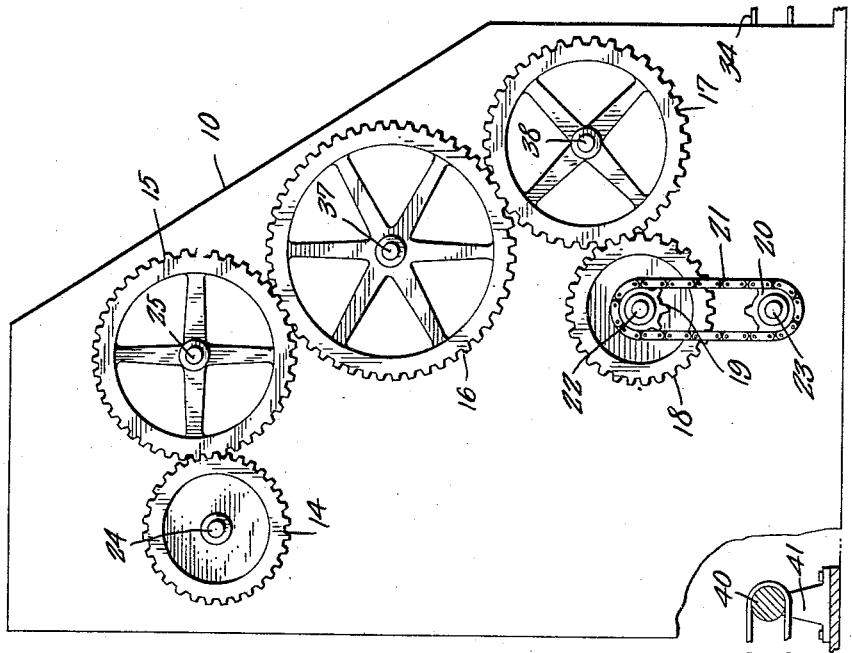
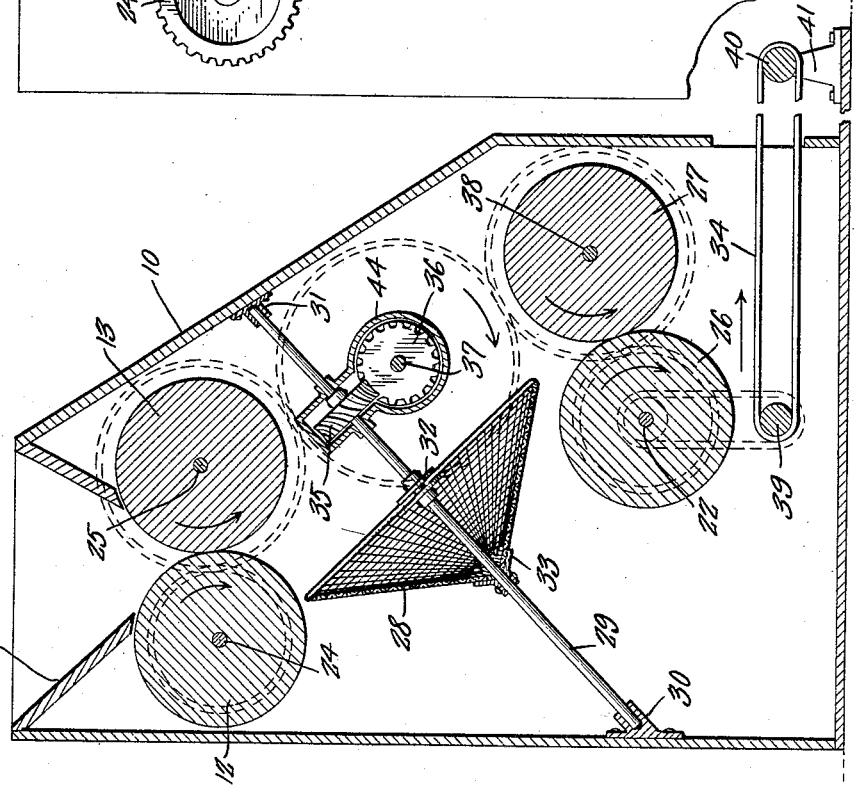
Bernard J. Coomes,
INVENTOR Patented Aug. 26, 1930

1,774,318

UNITED STATES PATENT OFFICE

BERNARD J. COOMES, OF ALGONQUIN, ILLINOIS

APPARATUS FOR REDUCING GRAVEL TO SAND

Application filed February 20, 1928. Serial No. 255,741.

The present invention relates to devices for pulverizing gravel and reducing the same to sand.

Objects of the invention are to provide effective means for reducing gravel to sand which will pulverize the gravel and will give a uniform and natural looking result.

Another object is to provide means for subjecting the partially pulverized material to a second pulverizing operation.

Further objects are simplicity in construction, effectiveness in use and simplicity of operation.

In the drawings:—

Figure 1 is a section through the machine made in accordance with the principles of my invention.

Figure 2 is a side elevation of the same.

In the drawings, 10 designates a casing having a hopper 11 in the upper portion thereof beneath which are located a pair of pulverizing rollers 12 and 13 in cooperative relation to each other, said rollers being spaced apart a distance so as to receive the gravel therebetween and crush the same as the rollers rotate toward each other. The rotation of the rollers is effected through a train of gears 14, 15, 16, 17 and 18, the latter of which is driven by means of sprockets 19 and 20 about which is trained a sprocket chain 21, the sprockets being respectively mounted on shafts 22 and 23. The roller 12 is mounted on a shaft 24 to which the gear 14 is connected, the roller 13 to a shaft 25 to which gear 15 is connected.

The rollers 12 and 13 are located as indicated above in the upper portion of the casing 10 and adjacent the hopper 11. Lying in spaced relation to said rollers 12 and 13 and in the lower portion of the casing 10 is a pair of rollers 26 and 27 in substantially contacting relation to each other and adapted to rotate toward each other, the roller 26 in a clockwise and the roller 27 in an anti-clockwise direction. The rollers 12 and 13 pulverize the material to a certain degree of fineness, part of the material being reduced to the fineness of sand and part of which being a size too large to be passed as sand. The rollers 26 and 27 perform the function of completing the crushing of the larger particles which are delivered thereto from the rollers 12 and 13 through the instrumentality of a conical-shaped sieve 28 mounted upon a shaft 29 which is suitably journaled in the casing by means of bearings 30 and 31 mounted on the walls of said casing. The shaft 29 is arranged diagonally across the casing and the sieve 28 is suitably secured thereto by means of the hubs 32 and 33, the sieve 28 being arranged in position beneath the rollers 12 and 13 to receive the product of crushed gravel therefrom and the shaft 29 is rotatable in order to effect a separation of the fine material from the coarser. The hub 32 receives cross arms that have their ends secured to the side edges of the sieve, while the hub 33 secures the apex of the sieve to the shaft 29.

The sieve 28 is tilted at an angle such that the coarser material will gradually move toward the edge thereof both under the influence of centrifugal force and by gravitation and will be delivered between the rollers 26 and 27 where it will be further pulverized and delivered to the endless belt 34 upon which it will be conveyed out of the casing. Finer material will pass through the meshes of the sieve and will be deposited in the bottom of the casing.

The shaft 29 is rotated through the gears 35 and 36, the former being mounted upon the shaft 29 and the latter on a shaft 37 journaled in the casing and extending through one of the walls thereof, said shaft 37 also carrying the gear 16 described above.

The roller 26 is mounted on the shaft 22 and the roller 27 on a shaft 38 on which the gear 17 is secured. Suitable driving means may be provided and constituting no part of the invention shown. The endless belt 34 is trained about rollers 39 and 40, the latter being supported by brackets 41 secured to the casing and the roller 39 being mounted on the shaft 23 journaled in the casing and on which the sprocket 20 is secured.

The gear 18 is also mounted on the shaft 22 and meshes with the gear 17 as stated above. The gears 35 and 36 are protected against the dust and sand within the casing 10 by means of a casing 44 secured in the casing 10.

In operation, gravel is delivered to the hopper 11 by which it is directed between the rollers 12 and 13 which rotate toward each other, the roller 12 in a clockwise and the roller 13 in an anti-clockwise direction. The gravel is crushed between said rollers and is delivered to the sieve 28 which is rotated by the shaft 29. The material is separated by the sieve 28 and in the movement of said sieve, the particles rub against each other wearing off to a degree the rougher edges giving the similitude of sand. The finer particles pass through the interstices of the sieve and are delivered to the bottom of the casing or on a trough directed toward the belt 34, and the larger particles are delivered from the edge of the sieve to and between the rollers 26 and 27 where they are further acted upon and reduced to the size of grains of sand whereupon the material is delivered to the endless belt and carried out of the hopper.

Having described my invention what I claim is:—

A device for reducing gravel to sand, comprising a casing, a hopper disposed in the upper portion of said casing, a pair of crushing rollers arranged below said hopper, a shaft journaled at an inclination in said casing, a conical shaped sieve secured to said shaft between the ends of the latter and disposed below said crushing rollers to receive material therefrom, hubs for the sieve and secured to the shaft, cross arms secured to one hub and the side edges of the sieve, a pair of crushing rollers below said sieve to receive unsifted material discharged over the outer and lower edge thereof, a conveyor below the last mentioned crushing rollers, means for rotating the crushing rollers, sieve and conveyor simultaneously, the sieve rotating means including a gear secured to the shaft, a gear meshing with the gear first mentioned and a housing for said gears.

In testimony whereof I affix my signature.

BERNARD J. COOMES.